July 22, 1958 J. B. PORTER 2,843,962
FISHPOLE HOLDER MECHANISM
Filed Aug. 16, 1956 2 Sheets-Sheet 1
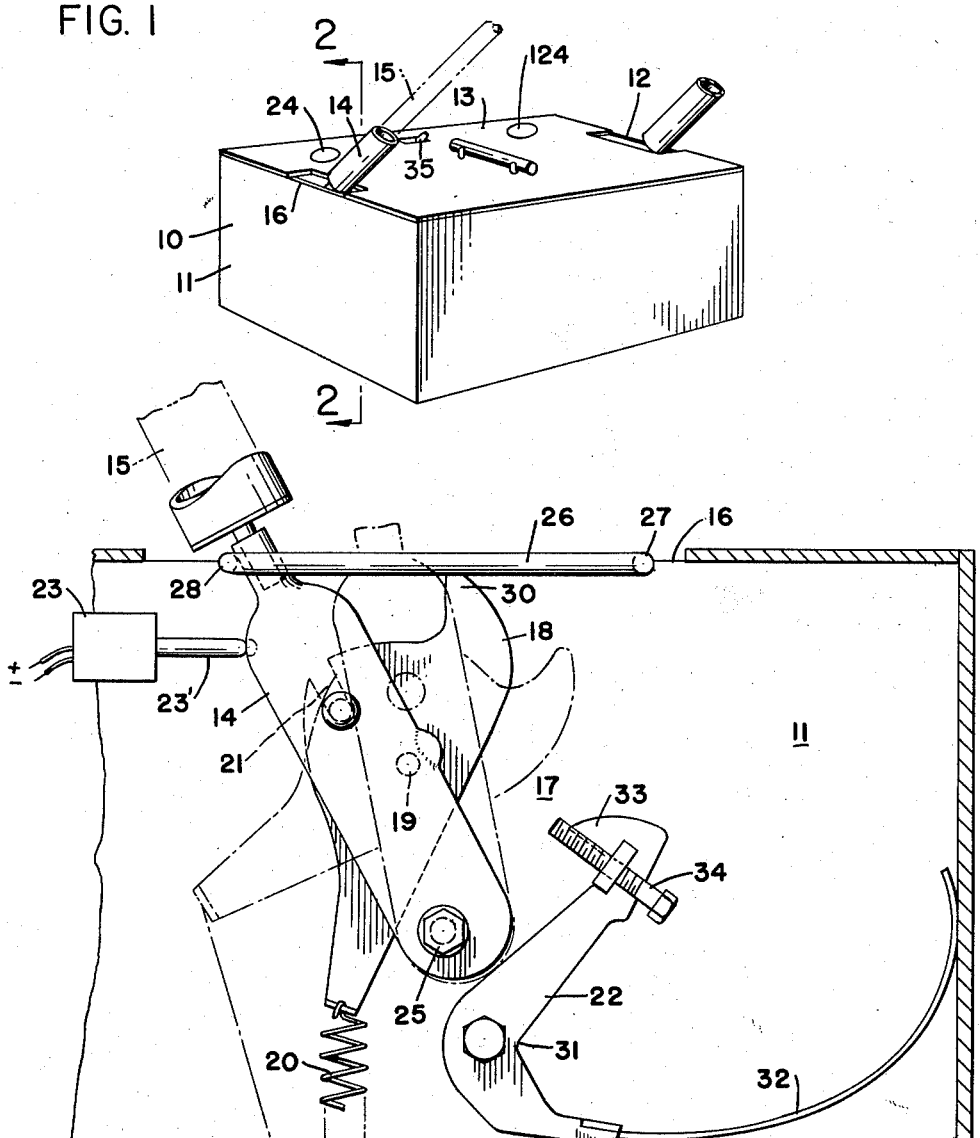
INVENTOR.
JOSEPH B. PORTER
BY
ATTORNEY July 22, 1958 J. B. PORTER 2,843,962
FISHPOLE HOLDER MECHANISM
Filed Aug. 16, 1956 2 Sheets-Sheet 2
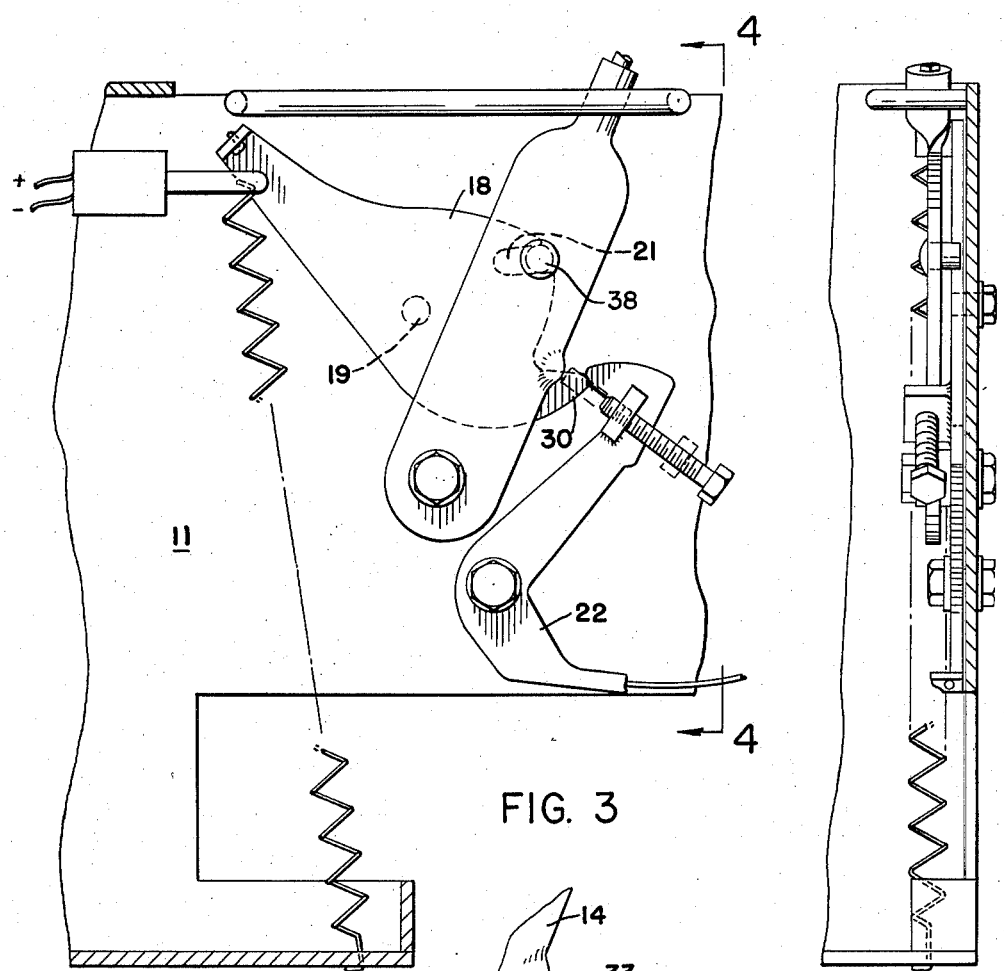
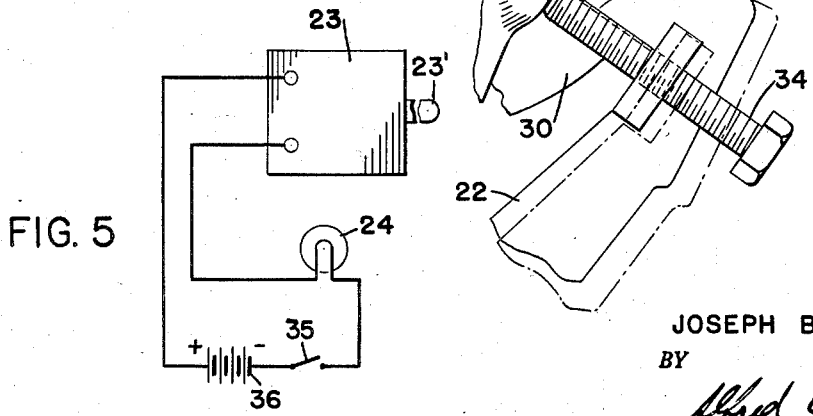
INVENTOR.
JOSEPH B. PORTER
BY
Alfred C. Body
ATTORNEY

United States Patent Office 2,843,962
Patented July 22, 1958

2,843,962

FISHPOLE HOLDER MECHANISM

Joseph B. Porter, Cleveland, Ohio

Application August 16, 1956, Serial No. 604,406

3 Claims. (Cl. 43—15)

The present invention pertains to apparatus for holding fishpoles and, more in particular, to an apparatus which holds the fishpole in such manner that the fishpole is snapped to hook a fish when the fish bites and exerts a slight tug on the line, the apparatus being of a design which may be incorporated in a tackle box.

Various types of devices and appartus have been designed in the past wherein a spring pulls the pole backwards to hook the fish when the fish bites on the hook. These prior devices usually have some type of catch which must be released so that the spring will pull the pole backwards to hook the fish. Usually, this spring device was loaded and set when the fishing line was extended and a triggering device was provided to release the spring or the catch when the fish pulled on the line. The spring then caused the pole to pivot upwardly and rearwardly on its base to pull the line inwardly and hook the fish.

These prior devices were generally of such design that they were either awkward and cumbersome to use or were sufficiently large so that they had to be used with all of the working parts out in the open. When the parts are operating out in the open, they can easily become entangled with bushes along the side of the stream, or in a boat can become dangerous if the fisherman's clothing, etc., gets tangled with the apparatus. Furthermore, these devices meant extra equipment which had to be carried by the fisherman and which could become entangled or damaged during the transporting of the equipment to and from the place of fishing.

The present invention contemplates an extremely simple fish-catching device which may be enclosed entirely within a tackle box and made a part of the tackle box so that there is no chance of damaging the unit during transport or of entangling other materials with in.

The invention further contemplates a fish-catching device which is simple in structure, light in weight, and has spring-actuating means controlled by a spring pawl to snap the pole backwards to hook the fish.

The invention further contemplates a fish-catching device in which a flashing light is associated with the device in such manner that the light flashes on and off after the fish has been hooked, the light being controlled by the fish tugging on the line on the fishpole.

In accordance with the present invention, the fish-catching device has means for supporting the fishpole for pivotal angular movement about the butt end thereof from a fist or extended position wherein the line is in the water to a second or retracted position wherein the line has hooked the fish and pulled the fish towards the butt of the pole. This supporting means may be in the form of a pole support pivotally connected to a wall of the tackle box with the support extending upwardly through a hole in the top of the tackle box. Associated with the pole support is a spring-actuating device to snap the pole in the backward direction to hook the fish. The spring-actuated device may be in the form of a latch member pivoted on the wall of the tackle box and having a portion thereof interassociated with the pole support and a spring interconnected between the latch member and the wall of the box to urge the latch member and thus the pole in the said rearward or backward direction. The latch member may be held in position wherein the pole is in the forward position and the spring of the spring-actuated means is in tension by suitable means such, for example, the spring-actuated pawl mounted on the walls of the tackle box and engageable with the latch member when the pole is in the forward position. The spring-actuated pawl is of such design that it will release the latch member when a sudden jerk forward is applied on the pole, thus permitting the spring-actuating means to snap the pole backwards and hook the fish. After the pole has been snapped backwards, either the pole support or the latch member preferably engage and control the switch of a light in such manner that intermittent tugging by the fish and thereby slight pivotal movement of the pole against the tension of the spring in the spring-actuated means causes the light to flash or blink so that the fisherman knows that a fish has been hooked and is still on the line.

The present structure provides a means for carrying out the invention in which one of the main objects is to provide a fish-catching device which will hook a fish.

A further object of the invention is to provide a fish-catching device which is simple in construction, easy to manufacture, and may be enclosed within and incorporated with a tackle box so that the structure cannot become entangled with bushes, clothing, or the like.

A still further object of the invention is to provide a fish-catching device which will support a fishpole, snap the fishpole backwards to hook a fish when a fish bites the hook, and then will light a light to notify the fisherman that a fish has been hooked.

Further objects of the invention will become apparent from the following description of the preferred embodiment of the invention, taken in conjunction with the accompanying drawings in which;

Figure 1 is a perspective view of a tackle box incorporating the present invention;

Figure 2 is a fragmentary sectional view approximately along the line 2—2 of Figure 1 showing in plan view the mechanism of the present invention with the pole in rearward position;

Figure 3 is a view similar to Figure 2 but showing the pole in the forward position;

Figure 4 is a sectional view approximately along the line 4—4 of Figure 3;

Figure 5 is a wiring diagram of the electrical circuit used herein; and

Figure 6 is an enlarged fragmentary plan view illustrating the cooperation of the spring pawl and the latch mechanism.

The invention may take form in the preferred embodiment which is illustrated and described herein for purposes of description and not of limitation. In this preferred embodiment, the invention is used in connection with a tackle box 10 having opposite walls 11 and 12 and a top 13. Since corresponding devices may be used on the opposite ends or walls of the box, the description and drawings illustrate only one of these devices, it being understood that the other device may be constructed and operates similarly thereto. In this instance, the fish-catching device is illustrated and described in connection with the end or wall 11 of the tackle box 10.

In accordance with the present invention, the fish-catching device has a fishpole support member 14 for supporting a fishpole 15 for pivotal angular movement about the butt end thereof from a first or rest position as illustrated in Figure 3 and wherein the fishline (not shown in the drawings) is in the water, to a second or fish caught position as illustrated in Figure 2 wherein the line has hooked a fish and pulled the fish towards the butt of the pole. The support member or pole support 14 is pivotally connected to a base e. g. the wall 11 of the tackle box 10 by means of a pivot pin and extends upwardly and through a slot or hole 16 in the top 13 of the tackle box 10. Associated with the pole support member 14 is a spring actuated device 17 to snap the pole in a backward direction or from the position of Figure 3 to the position of Figure 2 to hook the fish which bites and tugs on the line.

The spring actuated device 17 may be in the form of a latch member 18 pivoted at 19 on the wall 11 of the tackle box 10 and a spring 20 interconnected between the latch member and the wall of the box to urge the latch member from the tension position shown in Figure 3 to a released position shown in Figure 2 in one direction. The latch member 18 and the pole support 14 have interengaging means so that the pole is moved in the fish caught direction when the latch member 18 moves to the release position.

The latch member may be held in the tension position by suitable means such, as for example, a spring actuated pawl 22 which is also mounted on the wall 11 of the tackle box 10 and is engageable with a portion 30 on the latch member 18 when the pole support 14 is in the rest position of Figure 3. The spring-actuated pawl 22 is so arranged that it will release from the latch member 18 when a sudden jerk to the right is applied on the pole 15 and thus on the pole support 14, thus permitting the spring-actuating means 17 to snap the pole support 14 to the left from the position of Figure 3 to the position of Figure 2 to hook the fish. After the fish has been hooked, it will continue tugging on the line and thus will continually and intermittently snap the pole support slightly forward thus giving it a somewhat oscillating or vibrational movement. The present invention uses this movement to control a light so that the light will flash on and off and thereby signal the fisherman that he has hooked a fish and that it is still on the line. This feature may be easily accomplished by having either the support member 14 or the latch member 18 engage a switch 23 mounted on the inside of the wall 11 of the tackle box and adapted to control a light 24 mounted in the top 13 of the box. Naturally, the light may be powered by batteries or other suitable means, as hereinafter more fully described.

As was previously described, the support member 14 is pivoted to the wall 11 by the bolt, or the like, 25 located at a distance from the top 13 and at the bottom end of the pole support 14. The pole support, in pivoting around the pin 25, has a pivotal movement relative to the top 13 thus requiring the hole 16 to be elongated in a direction parallel to the wall 11 and transverse to the pivot axis. Sidewise motion in a direction somewhat longitudinal of the pivot axis at pin 25 of the support member is easily retarded by welding or otherwise securing a long bar 26 to the wall 11 and near the top 13 with the support member extending between the bar 26 and the wall 11. This bar 26 also provides stop means to control the amount of pivotal movement of the bar since its ends 27 and 28 are welded or secured to the wall and thus are abutted by the pole support 14 at the ends of its pivotal travel.

The pivot point 19, which is the point at which the latch member 18 is pivotally mounted on the wall 11 by a pivot pin, bolt, or other suitable means is located between the pivot pin 25 and the top 13 of the box. The pivot axis at point 19 is generally parallel to the pivot axis of pin 25. In this particular embodiment, the spring 20 is fastened to the latch member 18 on one side of the pivot 19 and the latch member's pawl engaging portion 30 is located on the opposite side of the pivot 19 so that the spring 20 will not interfere with the action of the spring-actuated pawl 22. The other end of the spring 20 is in this instance connected to the bottom of the box or to a point below and further from the top 13 than the pin 25.

The spring actuated pawl 22 is preferably pivotally mounted at a pivot connection 31 which also is further from the top 13 than the pivot pin 25 of the pole support member 14. Thus, the spring-actuated pawl has spring means, such as a leaf spring or wire spring 32 extending outwardly therefrom on one side of the pivot and engageable with the bottom and/or the side of the box to urge the spring-actuated pawl pivotally about pivot 31 and towards the pivot pin 25 and the pivot 19 and towards the latch member 18. The spring-actuated pawl 22 has a dog portion 33 at a distance from the pivot 31 and adapted to hook over the pawl engaging portion 30 of the latch member 18 to hold the latch member in latched position or the forward position as illustrated in Figure 3.

In Figure 2 the latch member 18 and the dog portion 33 are illustrated in unlatched positions.

As is illustrated, the dog portion 33 is also provided with a screw 34 which may be in the form of an ordinary set screw and which extends outwardly beyond the dog portion 33 and is abuttable against the support member 14. Adjusting of the set screw 34 regulates the degree of action engagement between the dog 33 and the pawl-engaging portion 30, with the set screw 34 permitting fingertip control or adjustment so that a slight tugging on the line moves the pole support 14 in a direction slightly beyond the engaging position of the pawl-engaging portion 30 with the dog 33.

In Figure 6, the positions of the support member 14, the pawl-engaging portion 30 of latch member 18, the dog portion 33 of the spring-actuated pawl 22, and the set screw 34 are illustrated in one position in solid lines with the dog portion and the pawl-engaging portion engaging each other. Since the pole support member 14 is in the forward or rest position, and also for purposes of description, the pawl-engaging portion 30 and the dog portion 33 are illustrated in considerable overlapping relationship and probably more overlapping relationship than can be used if the device is going to unlatch when a fish tugs on the line. In the same figure and in phantom, is illustrated the changing of position of the dog portion 33 relative to the pawl-engaging portion 30 by means of adjusting the set screw 34. It is noted that turning of the set screw 34 will allow the dog portion 33 to be moved back away from the member 14 and thus decrease the overlapping engagement thereof with the pawl-engaging 30 until the correct adjustment or correct engagement between the two has been obtained so that the spring 22 will snap the pole 14 backwards by means of latch member 18 and cause complete disengagement of these portions 30 and 32 so that the device can move to the position illustrated in Figure 2.

The operative connection, in this particular instance, between the pole support member 14 and the latch member 18 is in the form of a slot 21 in the latch member 18 and a pin 38 on the pole support 14 forming a cam surface and a cam follower respectively. The slot 21 has an arcuate surface with a center of curvature at or close to the shaft 25 which is the pivot center for the member 14. This arrangement provides a loose coupling between the members which permits movement of the pole support member 14 relative to the latch member 18 when the pole support member 14 is in the forward position as illustrated in Figure 3. Such relative movement is necessary to permit jerking of the pole support angularly forward beyond its regular maintained forward position to unlatch the spring-actuated pawl 22 so that the pole will be snapped to the fish caught position.

Earlier in the application, it was mentioned that when the device is in the fish caught position and a fish is tugging on the line to oscillate the pole support member 14, this member 14 operates through an electric switch 23 to turn the light 24 on and off intermittently or flash it to let the fisherman know that a fish is on the line. The electrical circuit for this device is illustrated in Figure 5. This circuit preferably has the switch 23, the light 24, a master switch 35 and a battery 36 connected in series. The switch 23 may be a normally open switch so that the light will remain off when the pole is not bumping the switch-operating member 23' thereof.

It is understood, however, that this switch 23 may be a normally closed switch, if desired, and in such case, would permit the lighting of the light 24 when the pole member is away from the member 23' and would shut off the light when the pole member 14 engages member 23'. It is also understood that if desired, the switch 23 may be operated by the latch member 18 instead of by the pole support member 14.

The master switch 35 may be placed in the top 13 of the box as illustrated in Figure 1 and the battery 36 is generally placed somewhere inside the box. Suitable wiring may be used for connecting the switches and other electrical components together. The main purpose of the switch 35 is so that the whole electrical circuitry can be disconnected and rendered inoperative when the tackle box or the device is not in use.

In this particular instance, a second light 124, illustrated in the top 13 of the box, would be connected with the other device on that end of the box. However, it is understood that the light 124 and its operating switch may be connected in parallel with the light and operating switch illustrated in Figure 5 so that both lights and both flashing or pole supporting member actuated switches operate off of the same battery and are controlled in part by the one master control switch 35.

It is understood that various modifications of the invention will become apparent from the foregoing description, which is directed to a preferred embodiment of the invention and was not intended, in any way, to limit or restrict the invention.

Having thus described my invention, I claim:

1. A fish catching device comprising a base, a spring biased latch member mounted on said base and having both a tension and a released position, a spring actuated pawl releasably engageable with said member and when engaged therewith holding same in the tension position, a fish pole support member movable about a pivot center from a rest to a fish caught position, one of said members having a cam surface, the other of said members having a follower adapted to be engaged by said cam surface when said spring biased member moves from the tension to the released position whereby to move the pole support arm from the rest to the fish caught position, said cam surface being curved and having a center of curvature when the spring biased member is in the tensioned position and the pole support member is in the rest position corresponding to the pivot center of said pole support member whereby said pole support member may move freely under the influence of external forces thereon, said spring actuated pawl having means engageable with said pole support member when said member moves in one direction to release said spring biased arm.

2. The combination of claim 1 including switch means, an electric power source and a signal light, said switch means being mounted on said base to be engaged by said pole support member when in the fish caught position.

3. A fish catching device comprising in combination a spring biased member having both a tension and a released position, a pawl releasably engageable with said member and when engaged therewith, holding said member in the tension position, a pole support member movable from a rest position to a fish caught position, coacting means on said members for moving said pole support arm to the fish caught position when said spring biased member moves to the released position, said means being free of each other when said spring biased member is in the tension position whereby said pole support may move freely, and coacting means between said support member and said pawl for releasing said spring biased member upon a predetermined movement under external forces of said pole support member.

References Cited in the file of this patent

UNITED STATES PATENTS

| | | |
|---|---|---|
| 693,071 | Ruud | Feb. 11, 1902 |
| 2,009,736 | Kornichuk | July 30, 1935 |
| 2,032,537 | Kozikowski | Mar. 3, 1936 |
| 2,745,088 | Bauer | May 8, 1956 |
| 2,783,574 | Bayes | Mar. 5, 1957 |